United States Patent [19]

Miyoshi et al.

[11] Patent Number: 4,476,035

[45] Date of Patent: Oct. 9, 1984

[54] MAGNETIC COATING FOR MAGNETIC RECORDING MEDIA

[75] Inventors: Shigeto Miyoshi; Kanehisa Hanabusa, both of Shibukawa; Toshio Kagami, Takasaki, all of Japan

[73] Assignee: Denki Kagaku Kogyo Kabushiki Kaisha, Tokyo, Japan

[21] Appl. No.: 453,918

[22] Filed: Dec. 28, 1982

[30] Foreign Application Priority Data

Dec. 28, 1981 [JP] Japan .................................. 56-209614

[51] Int. Cl.$^3$ ..................... B32B 27/30; G11B 5/68; G11B 5/70
[52] U.S. Cl. ............................. 252/62.54; 428/425.9; 428/694; 428/900; 524/431; 524/507
[58] Field of Search ..................... 428/425.9, 900, 694; 252/62.54; 524/507, 431

[56] References Cited

U.S. PATENT DOCUMENTS

| | | | |
|---|---|---|---|
| 4,323,628 | 4/1982 | Okuyama et al. | 428/425.9 |
| 4,352,859 | 10/1982 | Yoda et al. | 428/425.9 |
| 4,388,376 | 6/1983 | Kubota | 428/425.9 |
| 4,400,435 | 8/1983 | Yoda et al. | 428/694 |

FOREIGN PATENT DOCUMENTS

| | | | |
|---|---|---|---|
| 0151406 | 11/1979 | Japan | 428/425.9 |
| 0151408 | 11/1979 | Japan | 428/425.9 |
| 0151412 | 11/1979 | Japan | 428/425.9 |
| 0151416 | 11/1979 | Japan | 428/425.9 |

*Primary Examiner*—Herbert J. Lilling
*Attorney, Agent, or Firm*—Armstrong, Nikaido, Marmelstein & Kubovcik

[57] ABSTRACT

A magnetic coating for a magnetic recording medium prepared by kneading a copolymer comprising vinyl chloride, a vinyl carboxylate ester, vinyl alcohol and an unsaturated dicarboxylic acid and/or an unsaturated dicarboxylic acid anhydride; a thermosetting resin; and a magnetic powder, in an organic solvent.

12 Claims, No Drawings

MAGNETIC COATING FOR MAGNETIC RECORDING MEDIA

BACKGROUND OF THE INVENTION

The present invention relates to a magnetic coating for magnetic recording media. More particularly, the present invention relates to a magnetic coating for magnetic recording media containing a copolymer comprising (A) vinyl chloride, (B) a vinyl carboxylate ester, (C) vinyl alcohol and (D) an unsaturated dicarboxylic acid and/or an unsaturated discarboxylic acid anhydride; a thermosetting resin; a magnetic powder; and an organic solvent.

In general, a magnetic recording media, such as a magnetic tape, a magnetic card and the like, is prepared by coating a substrate, such as polyester films, sheets and the like, with a magnetic coating which comprises a magnetic powder, a thermoplastic resin and a thermosetting resin, dissolved and dispersed in an organic solvent.

Vinyl chloride copolymers, vinylidene chloride copolymers, acrylic ester copolymers and methacrylic ester copolymers have been proposed as a thermoplastic resin which is suitable as substrate for the magnetic coating. Examples of such resins include vinyl chloride-vinyl acetate copolymer, vinyl chloride-vinyl acetate-vinyl alcohol terpolymer, vinyl chloride-vinyl acetate-maleic acid terpolymer and the like. However, when the magnetic coating is prepared using these resins, the following are not satisfactory: miscibility of the magnetic powder with the thermoplastic resin; miscibility when a thermosetting resin, such as polyurethane resin, is added; affinity of the substrate to be coated; state of the resulting magnetic coated film; and physical properties of the magnetic coating. It has been difficult to satisfactorily provide all such required physical properties for a magnetic coating with only one resin.

For example, vinyl chloride-vinyl acetate copolymer has poor reactivity with the polyurethane resin. When the magnetic coating containing the vinyl chloride-vinyl acetate copolymer is coated on the substrate, the coated film is easily peeled off and impractical for the magnetic recording media. Although vinyl chloride-vinyl acetate-vinyl alcohol terpolymer has a good dispersibility for the magnetic powder and a good reactivity with the polyurethane resin, the use of the terpolymer as a starting material for the magnetic coating provides a coating having a short pot life, and therefore, an inferior workability results. When such magnetic coating is applied onto substrates, such as polyester sheets, films and the like, the viscosity of the coating may increase with the elapse of time. Accordingly, it is necessary to lower the viscosity of the coating by initially adding a large amount of the organic solvent when preparing the coating. Thus, it is impossible to prepare a large amount of the coating at one time.

In general, vinyl chloride-vinyl acetate-maleic acid terpolymer is restricted in a maleic acid content. If the maleic acid content thereof is too large, a clear solution cannot be obtained, and therefore, the content is restricted from about 1% to 2%. However, the use of such a vinyl chloride-vinyl acetate-maleic acid terpolymer containing such a small amount of maleic acid cannot sufficiently improve the dispersibility of the magnetic powder. Also, the vinyl chloride-vinyl acetate-maleic acid terpolymer has a high reactivity with polyurethane resin, and with other terpolymers, and therefore, the use of the terpolymer as a starting material for the magnetic coating provides a coating having a short pot life and inferior workability.

SUMMARY OF THE INVENTION

A thermoplastic resin according to the present invention is a copolymer comprising (A) vinyl chloride, (B) vinyl carboxylate ester, (C) vinyl alcohol, and (D) an unsaturated dicarboxylic acid, an unsaturated dicarboxylic acid anhydride or a mixture of the unsaturated dicarboxylic acid and the unsaturated dicarboxylic acid anhydride as fourth component. When the thermoplastic resin, according to the present invention, is used, the dispersibility of a magnetic powder, the pot life and the like can be significantly improved. When the thermoplastic resin, according to the present invention, is used as the starting material in a magnetic coating for a magnetic recording medium, the required characteristics can be considerably improved, when compared to the prior art thermoplastic resin compositions, and an excellent magnetic coating can be obtained.

When the unsaturated dicarboxylic acid is used alone, as the fourth component in the thermoplastic resin, the dispersibility of the magnetic powder can be dramatically improved when compared to the prior art resin. When the unsaturated dicarboxylic acid anhydride is used alone as the fourth component, not only is the dispersibility of the magnetic powder improved when compared to the prior art resin, but also the reactivity with the thermosetting resin can be inhibited, and therefore, a composition having a long pot life can be obtained. When the unsaturated dicarboxylic acid and the unsaturated dicarboxylic acid anhydride are used in combination as the fourth component, a high dispersibility of the magnetic powder can be maintained and a composition having a long pot life can be obtained. When the magnetic coating containing such mixture is coated on a substrate of polyester sheet, a smooth magnetic coating film having a high gloss is obtained. When this film is dried and pressed to form a magnetic tape, no blocking occurs, even if such magnetic tape is allowed to stand under unfavorable conditions (i.e., high temperatures and high humidity). The magnetic tape thus obtained has excellent characteristics. These features cannot be obtained when a mixture of vinyl chloride-vinyl ester-vinyl alcohol terpolymer and vinyl chloride-vinyl ester-unsaturated carboxylic acid copolymer is used in place of the thermoplastic resin of the present invention.

DETAILED DESCRIPTION OF THE INVENTION

A copolymer of the present invention can be a resin solution obtained by copolymerizing said monomers.

Vinyl chloride may be a commercially available conventional compound. Examples of the vinyl carboxylate ester component (B), which is copolymerized with vinyl chloride, include vinyl acetate, vinyl propionate, vinyl versatate (the trade name of the product manufactured by Shell Chemical Company), vinyl stearate and the like. Among these compounds, vinyl acetate is preferred. The unsaturated dicarboxylic acid component (D) may be selected from maleic acid, itaconic acid, fumaric acid and the like. Among these compounds, maleic acid is preferred. Maleic anhydride and itaconic anhydride are preferably used as an unsaturated dicarboxylic acid anhydride. Other unsaturated carboxylic acid anhydrides include fumaric anhydride, Hymic acid anhydride (the trade name of the product manufactured by Hitach Kasei K. K., Japan) and the like. The vinyl alcohol component (C) can be obtained by the saponification of the polymerized vinyl carboxylate ester (the component (B)). While acids such as hydrochloric acid, sulfuric acid, nitric acid and the like and alkalis such as caustic soda, caustic potash and the like can be used as the saponifying agent; generally hydrochloric acid is most preferred. For example, the monomers of three components (A), (B) and (D) are copolymerized and the resulting copolymer is then partially saponified with hydrochloric acid in the presence of alcohol to obtain the vinyl alcohol copolymer component.

The monomer composition of the copolymer of the present invention will be described hereinafter.

In the thermoplastic resin composition according to the present invention, the vinyl chloride component (A) is used in an amount of 90% to 50% by weight of all components. If the amount of vinyl chloride is larger than 90% by weight, the viscosity of the solution may increase when mixed with a magnetic powder. Accordingly, the viscosity of the coating must be reduced during the application of the coating onto the substrate. This results in the use of a large amount of a solvent. On the other hand, if the amount of vinyl chloride is smaller than 50% by weight, the strength of surfaces of the coated film is weak, the coated film can easily be peeled off and blocking phenomenon may occur.

The vinyl alcohol component (C) is used in an amount of 3% to 20% by weight based on (A)+(B)+(C), i.e., the sum of the weights of components (A), (B) and (C). If the amount of the component (C) vinyl alcohol is larger than 20% by weight of (A)+(B)+(C), the reaction with the polyurethane proceeds too rapid, the pot life of the magnetic coating becomes short, and it is impossible to prepare a large amount of the coating at a time. On the other hand, if the amount of vinyl alcohol is smaller than 3% by weight, the compatibility with the polyurethane resin may reduce and the dispersibility of the magnetic powder cannot be improved.

While either the unsaturated dicarboxylic acid or the unsaturated dicarboxylic acid anhydride may be used as the component (D), the use of both compounds is desirable. When the unsaturated dicarboxylic acid alone is used, the dispersibility of the magnetic powder is good, but the reaction with the thermosetting resin becomes rapid. When the unsaturated dicarboxylic acid alone is used, the pot life of the coating tends to be lengthened. It is desirable that the unsaturated dicarboxylic acid or the unsaturated dicarboxylic acid anhydride be used in the amount of 5% to 90%, based on the sum of the unsaturated dicarboxylic acid and the unsaturated dicarboxylic acid anhydride.

The component (D) is used in an amount of 0.1 to 5 parts by weight, preferably from 1 to 5 parts by weight, based on 100 parts by weight of (A)+(B)+(C). If the amount of the component (D) is smaller than 0.1 parts by weight, the reaction with the thermosetting resin is slow and the dispersibility of the magnetic powder is reduced. On the other hand, if the amount of the component (D) is larger than 5 parts by weight, the reaction with the thermosetting resin is rapid and therefore, such amount is impractical.

The average degree of polymerization of the vinyl chloride-containing copolymer, according to the present invention, is from 100 to 900. When coating the magnetic coating on the substrate, if the average degree of polymerization is less than 100, the resulting coated film is weak and therefore, impractical. On the other hand, if the average degree of polymerization is more than 900, the viscosity of the coating is high and a good workability cannot be obtained. In general, it is desirable to use copolymer having average degree of polymerization of from 150 to 750.

A representative process for producing vinyl chloride-containing copolymer resin, according to the present invention, will be described hereinafter. A polymerization vessel may be charged with vinyl chloride and vinyl carboxylate ester at such a ratio that said copolymer composition is obtained. The vessel is then charged with oil-soluble polymerization initiators, such as benzoyl peroxide and the like, and a solvent, and the content is heated under pressure to effect polymerization. While the unsaturated dicarboxylic acid and/or the unsaturated dicarboxylic acid anhydride may be added at the initial stage of the polymerization as an undivided whole, other means can be used. For example, a portion of the unsaturated dicarboxylic acid and/or anhydride thereof can be added at the initial stage of the polymerization and the remaining portion added intermittently with the progress of the polymerization. Alternatively, the total amount of the unsaturated dicarboxylic acid and/or anhydride thereof can be added intermittently. The use of such processes for intermittently adding the component (D) is more preferred, because a copolymer resin having a uniform composition can be obtained, which results in the dispersibility when forming the magnetic coating and the reactivity with the thermosetting resin being good.

The vinyl chloride-containing copolymer obtained above is saponified using hydrochloric acid as a catalyst in the presence of alcohol to convert a predetermined amount of vinyl carboxylate ester into vinyl alcohol; thereafter, the organic solvent is removed to form a powdered product. Alternatively, after the saponification, only the alcohol can be removed from the organic solvents by means of the vacuum distillation. This is useful when the solution containing the organic solvent can be adapted for uses as it is.

The thermosetting resins suitable for the magnetic coating used in combination with the vinyl chloride-containing copolymer resin according to the present invention, include polyurethane resin, epoxy resin and phenol resin. When polyester resin is used as the substrate, the polyurethane resin is suitable.

When preparing the magnetic coating of the vinyl chloride-containing copolymer resin, from 200 to 600 parts by weight, and preferably from 300 to 500 parts by weight, of ferromagnetic iron oxide; from 600 to 1200 parts by weight, and preferably from 800 to 1000 parts by weight, of the organic solvent; and from 5 to 50 parts by weight, and preferably from 10 to 30 parts, by weight of the thermosetting resin per 100 parts by weight of the vinyl chloride-containing copolymer resin may be blended.

The following examples illustrate, but in no way limit, the present invention.

EXAMPLE 1

An autoclave was charged with 160 parts by weight of vinyl chloride, 40 parts by weight of vinyl acetate, 180 parts by weight of acetone and 2 parts by weight of benzoyl peroxide, and polymerization was initiated at a temperature of 50° C. When the percent of polymerization of the vinyl chloride-vinyl acetate was 10%, a portion (1/6) of a mixture comprising 1.2 parts by weight of maleic anhydride, 2.8 parts by weight of maleic acid and 20 parts by weight of acetone was added to the reaction mixture. The remaining portion (5/6) was intermittently added until the percent of polymerization was 60%. The polymerization was continued until a polymerization percent of 90% was obtained and then reaction mixture was cooled. To this reaction mixture, 1200 parts by weight of methanol was added to pulverize the vinyl chloride-containing copolymer resin, and then the solvent was removed. To the resultant reaction mixture, 1200 parts by weight of methanol and 14 parts by weight of 38% hydrochloric acid were added, and the vinyl chloride-containing copolymer resin was saponified at a temperature of 60° C. When the percent of saponification of vinyl acetate was 70%, the reaction mixture was cooled and methanol was removed. To this resultant reaction mixture 1200 parts by weight of methanol was further added to wash the vinyl chloride-containing copolymer resin, and then methanol was removed again to dry the resin.

From analytical testing, this resin was a copolymer with a polymerization degree of 470, comprising 85 parts by weight of vinyl chloride, 6 parts by weight of vinyl acetate, 7 parts by weight of vinyl alcohol, 0.6 parts by weight of maleic anhydride and 1.4 parts by weight of maleic acid.

A magnetic coating was prepared using this copolymer (according to the procedure for measuring gloss as described hereinafter) and a coating film was formed. This copolymer and the resulting magnetic coating were tested according to the measurement methods and the decision standards as described hereinafter. As can be seen from the results, the compatibility of the copolymer was excellent; and the gloss of the copolymer when used in the magnetic coating was 99%, the pot life was 200 hours, no blocking tendency could occur, and the adhesion was good.

MEASUREMENT AND DECISION STANDARDS

| (1) Compatibility | Parts by Weight |
| --- | --- |
| Copolymer obtained in Examples and Comparison Examples (solid matter basis) | 100 parts |
| Trade name Collonate L (polyurethane resin) | 20 parts |
| Methyl ethyl ketone | 300 parts |

A blended solution having the above components was prepared. The resulting products were designated as follows: a transparent product, a translucent product and an opaque product were "A", "B" and "C", respectively.

| (2) Gloss | Parts by Weight |
| --- | --- |
| Copolymer obtained in Examples and Comparison Examples (solid matter basis) | 100 parts |
| Magnetic iron oxide powder | 400 parts |
| Methyl ethyl ketone | 300 parts |
| Methyl isobutyl ketone | 300 parts |

| -continued | |
| --- | --- |
| (2) Gloss | Parts by Weight |
| Toluene | 300 parts |
| Trade name Collonate L (polyurethane resin) | 20 parts |
| Trade name Lecithin (soybean oil) | 2 parts |

A blend comprising the above ingredients was sufficiently kneaded to obtain a magnetic coating. The magnetic coating was coated onto a substrate of polyester film in an amount so that the dry film thickness was 10 microns and then coating was dried for a minute at a temperature of 100° C. The resulting coated film was pressed for 30 seconds at a temperature of 90° C. under a pressure of 2 kg/cm$^2$ to impart smoothness. The resulting coated film was tested by means of a glossmeter to determine the reflectivity at 60° of angle of reflection.

(3) Pot Life of the Magnetic Coating

The same magnetic coating as used in the measurement of gloss was placed in a small-sized bottle and maintained in a thermostat at 25° C., and then the amount of time required for loss of the flow property of the coating (gelation time) was measured to determine the pot life.

(4) Blocking Tendency

The same magnetic coating as used in the measurement of gloss was coated on a substrate of a polyester film in an amount so that the film thickness after drying was 10 microns, and then the coating was dried for a minute at a temperature of 100° C. The coated substrates were superposed upon each other and loaded at a pressure of 2 kg/cm$^2$. The superposed substrates were allowed to stand for 24 hours at a temperature of 60° C. under a humidity of 90% and thereafter, the film was peeled off. Peeling off (with ease), slightly tacky adhesion and tacky adhesion were designated as "A", "B" and "C", respectively.

(5) Adhesion

The same magnetic coating as used in the measurement of gloss was coated on a substrate of polyester film in an amount so that the film thickness after drying was 10 microns, and then the coating was dried for a minute at a temperature of 100° C., to form a magnetic product. Cello-Tape (trade name) was affixed onto the coated film by vigorously pressing with fingers, and then the Cello-Tape was peeled off. The product in which no magnetically coated film adhered to said Cello-Tape; the product in which the coated film slightly adhered to said Cello-Tape; and the product in which the coated film adhered to said Cello-Tape, when said Cello-Tape was peeled off, were designated as "A", "B" and "C", respectively.

In the following examples and comparison examples, tests were carried out according to the above-described measurement and decision standards.

EXAMPLE 2

The thermoplastic copolymer and the magnetic coating were prepared by the method of Example 1, with the exception that the type of monomers, the ratio of the monomers charged and the saponification were varied widely. These conditions and results are shown in Table 1.

TABLE 1

| Test Nos. | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| Vinyl chloride (part by weight) | 50 | 60 | 60 | 60 | 60 | 70 | 70 | 70 | 70 | 75 | 75 | 75 | 75 | 75 | 80 | 80 | 80 |
| Vinyl carboxylate ester (part by weight) | a 47 | a 35 | a 35 | a 33 | a 32 | a 25 | a 22 | b 20 | a 20 | b 22 | a 20 | a 18 | a 16 | a 15 | b 17 | a 17 | a 15 |
| Vinyl alcohol (part by weight) | 3 | 5 | 5 | 7 | 8 | 5 | 8 | 10 | 10 | 3 | 5 | 7 | 9 | 10 | 3 | 3 | 2 |
| Unsaturated dicarboxylic acid anhydride (part by weight) | c 0.5 | c 0.5 | c 0.6 | c 0.5 | c 0.5 | c 0.3 | c 0.5 | c 0.3 | c 0.2 | c 0.5 | c 0.5 | f 0.2 | c 0.2 | c 0.1 | f 0.2 | c 0.5 | c 1.5 |
| Unsaturated dicarboxylic acid (part by weight) | d 1.0 | d 1.5 | d 1.4 | d 1.0 | d 1.0 | d 1.2 | d 1.0 | d 1.2 | d 1.8 | d 1.0 | d 1.0 | e 1.8 | d 1.8 | d 1.9 | e 1.8 | d 1.5 | d 2.5 |
| Polymerization degree | 120 | 250 | 250 | 250 | 300 | 400 | 400 | 400 | 400 | 430 | 430 | 430 | 430 | 430 | 450 | 450 | 490 |
| Compatibility | A | A | A | A | A | A | A | A | A | A | A | A | A | A | A | A | A |
| Gloss (%) | 95 | 96 | 97 | 95 | 98 | 95 | 92 | 90 | 90 | 95 | 95 | 93 | 93 | 92 | 90 | 95 | 95 |
| Pot life of magnetic coatings (hours) | 230 | 220 | 200 | 200 | 200 | 200 | 200 | 170 | 190 | 180 | 190 | 180 | 180 | 180 | 180 | 170 | 150 |
| Blocking tendency | B | B | B | A | A | A | A | A | A | A | A | A | A | A | A | A | A |
| Adhesion | A | A | A | A | A | A | A | A | A | A | A | A | A | A | A | A | A |

| Test Nos. | 18 | 19 | 20 | 21 | 22 | 23 | 24 | 25 | 26 | 27 |
|---|---|---|---|---|---|---|---|---|---|---|
| Vinyl chloride (part by weight) | 80 | 85 | 85 | 85 | 75 | 75 | 70 | 90 | 90 | 90 |
| Vinyl carboxylate ester (part by weight) | a 15 | a 7 | a 10 | a 5 | a 12 | a 10 | a 13 | a 4 | a 4 | a 4 |
| Vinyl alcohol (part by weight) | 5 | 3 | 5 | 10 | 13 | 15 | 17 | 5 | 5 | 4 |
| Unsaturated dicarboxylic acid anhydride (part by weight) | f 1.0 | c 1.0 | c 0.5 | c 0.5 | c 0.25 | c 4.75 | c 0.25 | c 1.0 | — 0 | c 1.0 |
| Unsaturated dicarboxylic acid (part by weight) | e 2.0 | d 3.0 | d 3.0 | d 3.5 | d 4.75 | d 0.25 | d 4.75 | — 0 | d 1.0 | d 1.0 |
| Polymerization degree | 480 | 490 | 500 | 510 | 450 | 450 | 470 | 400 | 400 | 400 |
| Compatibility | A | A | A | A | A | A | A | A | A | A |
| Gloss (%) | 90 | 90 | 90 | 85 | 92 | 85 | 80 | 85 | 95 | 93 |
| Pot life of magnetic coatings (hours) | 150 | 150 | 150 | 150 | 140 | 200 | 190 | 250 | 170 | 220 |
| Blocking tendency | A | A | A | A | A | A | A | A | A | A |
| Adhesion | A | A | A | A | A | A | A | A | A | A |

Note:
The symbols used in Table 1, and also in the following Tables, designate the following compounds:
a: vinyl acetate;
b: vinyl propionate
c: maleic anhydride;
d: maleic acid;
e: itaconic acid
f: itaconic anhydride

EXAMPLE 3

An autoclave was charged with 160 parts by weight of vinyl chloride, 40 parts by weight of vinyl acetate, 180 parts by weight of acetone, 2 parts by weight of benzoyl peroxide, 0.3 parts by weight of maleic anhydride and 0.7 parts by weight of maleic acid, and polymerization was initiated at a temperature of 50° C. When the percent of polymerization of vinyl chloride and vinyl acetate was 10%, a portion (⅓) of a mixture of 0.6 parts by weight of meleic anhydride, 1.4 parts by weight of maleic acid and 20 parts by weight of acetone was added. The remaining portion (⅔) was intermittently added until the polymerization continued to a polymerization percent of 90%, and then saponification was carried out in the same manner as Example 1.

The resultant resin was a copolymer with a polymerization degree of 480, comprising 85 parts by weight of vinyl chloride, 6 parts by weight of vinyl acetate, 7 parts by weight of vinyl alcohol, 0.5 parts by weight of maleic anhydride and 1.0 parts by weight of maleic acid. This copolymer had a good compatibility. The magnetic coating containing the copolymer had a pot life of 210 hours and the resultant magnetic film coated on a substrate had a gloss of 98%. Both the blocking tendency and an adhesion of the magnetic film were good.

EXAMPLE 4

An autoclave was charged with 160 parts by weight of vinyl chloride, 40 parts by weight of vinyl acetate, 180 parts by weight of acetone, 2 parts by weight of benzoyl peroxide, 1.2 parts by weight of maleic anhydride and 2.8 parts by weight of maleic acid, and polymerization was initiated at a temperature of 50° C. The polymerization was continued until the polymerization percent of vinyl chloride and vinyl acetate reached 90%, and then the saponification was carried out in the same manner as Example 1. The resultant resin was a copolymer with a polymerization degree of 470, comprising 85 parts by weight of vinyl chloride, 6 parts by weight of vinyl acetate, 7 parts by weight of vinyl alcohol, 0.6 parts by weight of maleic anhydride and 1.4 parts by weight of maleic acid. This copolymer had a good compatibility. The magnetic coating containing the copolymer had a pot life of 150 hours, and the resulting magnetic film applied to a substrate had a gloss of 90%. Both the blocking tendency and an adhesion of the magnetic film were good.

EXAMPLE 5

An autoclave was charged with 160 parts by weight of vinyl chloride, 40 parts by weight of vinyl acetate, 70 parts by weight of methyl ethyl ketone, 30 parts by weight of toluene, 2 parts by weight of benzoyl peroxide, 1.2 parts by weight of maleic anhydride and 2.8 parts by weight of maleic acid, and polymerization was initiated at a temperature of 50° C. After the percent of polymerization reached 90%, 60 parts by weight of methyl ethyl ketone, 20 parts by weight of toluene, 50 parts by weight of methanol and 14 parts by weight of hydrochloric acid were added to the reaction mixture to saponify at a temperature of 60° C. When the percent of saponification of vinyl acetate reached to 70%, the reaction mixture was cooled and 23 parts by weight of propylene oxide was added to the reaction mixture to decompose the remaining hydrochloric acid Methanol was removed by means of a vacuum distillation, and thereafter, methyl ethyl ketone and toluene were added so that a predetermined concentration could be obtained for preparing vinyl chloride-containing copolymer resin solution. The amounts of the monomers in the resin solution were 85 parts by weight of vinyl chloride, 6 parts by weight of vinyl acetate, 7 parts by weight of vinyl alcohol, 0.6 parts by weight of maleic anhydride and 1.4 parts by weight of maleic acid, and the polymerization degree was 250. This copolymer had a good compatibility. The magnetic coating containing the copolymer had a pot life of 170 hours, and the resulting magnetic film coated on a substrate had a gloss of 93%. Both the blocking tendency and an adhesion of the magnetic film were good.

EXAMPLE 6

Vinyl chloride-containing copolymer was prepared in the same manner as Example 4, except that itaconic anhydride and itaconic acid were substituted for maleic anhydride and maleic acid, respectively. The amounts of the monomers in the composition were 85 parts by weight of vinyl chloride, 6 parts by weight of vinyl acetate, 7 parts by weight of vinyl alcohol, 0.6 parts by weight of itaconic anhydride and 1.4 parts by weight of itaconic acid, and the polymerization degree was 450. This copolymer had a good compatibility. The magnetic coating containing the copolymer had a pot life of 130 hours, and the resulting magnetic film coated on a substrate had a gloss of 85%. Both the blocking tendency and an adhesion of the magnetic film were good.

COMPARISON EXAMPLE 1

A magnetic coating was prepared using the above-described method of testing gloss with the exception that the commercially available Vinylite resin "VAGH" (the trade name of the product manufactured by Union Carbide Corporation, USA; the ratio of monomers of which is shown in Table 2) was substituted for the copolymer resin of the present invention. The magnetic coating was coated on a polyester film. Each physical property was measured according to the previously-described measurement and decision standards, and the results obtained are shown in Table 2.

COMPARISON EXAMPLE 2

A magnetic coating was prepared in the same manner as Comparison Example 1, with the exception that Vinylite resin "VMCH" (the trade name of the product manufactured by Union Carbide Corporation, USA; the ratio of monomers of which is shown in Table 2) was substituted for Vinylite resin "VAGH". The magnetic coating was coated on a polyester film. Each physical property was measured, and the results obtained are shown in Table 2.

COMPARISON EXAMPLE 3

Copolymer resins were prepared in the same manner as that of Example 1, with the exception that the type of monomers, the ratio or amounts of monomers charged and the saponification percent were changed as shown in Table 2. Magnetic coatings were prepared from the resulting copolymer resins in the same manner as described in Example 1, and each physical property was measured. The results obtained are shown in Table 2.

TABLE 2

| Comparison Examples | 1 | 2 | 3 | | | | | | | |
|---|---|---|---|---|---|---|---|---|---|---|
| Test Nos. | | | 28 | 29 | 30 | 31 | 32 | 33 | 34 | 35 |
| Vinyl chloride (part by weight) | 91 | 85 | 45 | 40 | 92 | 92 | 95 | 95 | 75 | 75 |
| Vinyl acetate (part by weight) | 3 | 14 | 50 | 55 | 4 | 4 | 3 | 3 | 23 | 23 |
| Vinyl alcohol (part by weight) | 6 | — | 5 | 5 | 4 | 4 | 2 | 2 | 2 | 2 |
| Unsaturated dicarboxylic acid anhydride (part by weight) | — | — | c | — | — | c | c | c | c | c |
| | | | 0.4 | | | 3 | 4 | 6 | 5 | 1 |
| Unsaturated dicarboxylic acid (part by weight) | — | d | d | — | — | d | d | — | d | d |
| | | 1 | 1 | | | 3 | 4 | | 1 | 5 |
| Polymerization degree | 450 | 430 | 90 | 90 | 490 | 500 | 450 | 450 | 250 | 250 |
| Compatibility | B | C | A | A | C | C | B | B | B | B |
| Gloss (%) | 60 | 40 | 70 | 70 | 50 | 50 | 70 | 70 | 70 | 70 |
| Pot life of magnetic coatings (hours) | 30 | 48 | 220 | 30 | 220 | 220 | 190 | 220 | 240 | |
| Blocking tendency | A | A | C | C | A | A | A | A | A | A |
| Adhesion | C | C | A | C | C | A | A | A | B | A |

COMPARISON EXAMPLE 4

Vinylite resins "VAGH" and "VMCH" manufactured by Union Carbide Corporation, USA, which were used in Comparison Examples 1 and 2, were mixed at the ratios shown in Table 3, and magnetic coatings were prepared therefrom in the same manner as Comparison Example 1. The magnetic coatings were coated on the polyester films, and the physical properties of each were measured. The results obtained are shown in Table 3. It is noteworthy that gloss and a pot life were remarkably inferior to the magnetic coating of the present invention.

TABLE 3

| Comparison Example | 4 | | |
|---|---|---|---|
| Test Nos. | 36 | 37 | 38 |
| Blend ratios of VAGH/VMCH | 90/10 | 50/50 | 10/90 |
| Vinyl chloride (part by weight) | 90.4 | 88.0 | 85.6 |
| Vinyl acetate (part by weight) | 4.1 | 8.5 | 12.9 |
| Vinyl alcohol (part by weight) | 5.4 | 3.0 | 0.6 |
| Unsaturated dicarboxylic acid anhydride (part by weight) | — | — | — |
| Unsaturated dicarboxylic acid (part by weight) | d 0.1 | d 0.5 | d 0.9 |
| Polymerization degree | 450 | 440 | 450 |
| Compatibility | B | B | C |
| Gloss (%) | 55 | 50 | 40 |
| Pot life of magnetic coatings (hour) | 55 | 52 | 48 |
| Blocking tendency | A | A | A |
| Adhesion | C | C | C |

EXAMPLE 7

The thermoplastic copolymer and the resulting magnetic coating were prepared in the same manner as Example 1, with the exception that the type of monomers, the ratio or amounts of monomers charged and the percent of saponification were varied widely. These conditions and results are shown in Table 4.

TABLE 4

| Test Nos. | 39 | 40 | 41 | 42 | 43 | 44 | 45 | 46 | 47 | 48 |
|---|---|---|---|---|---|---|---|---|---|---|
| Vinyl chloride (part by weight) | 50 | 60 | 60 | 50 | 60 | 85 | 90 | 90 | 90 | 90 |
| Vinyl acetate (part by weight) | a 47 | a 35 | a 35 | a 47 | a 35 | a 8 | a 5 | a 4 | a 3 | a 2 |
| Vinyl alcohol (part by weight) | 3 | 5 | 5 | 3 | 5 | 7 | 5 | 6 | 7 | 8 |
| Unsaturated dicarboxylic acid anhydride (part by weight) | c 0.05 | c 0.1 | — | c 0.1 | c 0.1 | c 0.2 | c 0.3 | — | c 0.1 | — |
| Unsaturated dicarboxylic acid (part by weight) | d 0.05 | — | d 0.1 | d 0.1 | d 0.2 | d 0.1 | — | d 0.3 | e 0.1 | e 0.2 |
| Polymerization degree | 130 | 250 | 250 | 130 | 250 | 450 | 550 | 570 | 560 | 570 |
| Compatibility | A | A | A | A | A | A | A | A | A | A |
| Gloss (%) | 85 | 80 | 85 | 87 | 87 | 88 | 87 | 88 | 85 | 85 |
| Pot life of magnetic coatings (hour) | 140 | 150 | 150 | 160 | 170 | 170 | 190 | 190 | 170 | 170 |
| Blocking tendency | B | B | B | A | A | A | A | A | A | A |
| Adhesion | A | A | A | A | A | A | A | A | A | A |

EXAMPLE 8

An autoclave was charged with 180 parts by weight of vinyl chloride, 40 parts by weight of vinyl acetate, 180 parts by weight of acetone, 3 parts by weight of benzoyl peroxide, 0.3 parts by weight of maleic anhydride and 0.7 parts by weight of maleic acid, and polymerization was initiated at a temperature of 45° C. When the percent of polymerization of vinyl chloride and vinyl acetate was 10%, a portion (1/5) of a mixture of 0.6 parts by weight of maleic anhydride, 1.4 parts by weight of maleic acid and 20 parts by weight of acetone was added. The remaining portion (4/5) was intermittently added until the polymerization continued to a polymerization percent of 50%. The polymerization was continued until the polymerization percent reached 90%, and then the saponification was carried out in the same manner as Example 1.

The resultant resin was a copolymer with a polymerization degree of 720, comprising 90 parts by weight of vinyl chloride, 5 parts by weight of vinyl acetate, 5 parts by weight of vinyl alcohol, 0.5 parts by weight of maleic anhydride and 1.0 parts by weight of maleic acid. This copolymer had a good compatibility. The magnetic coating containing this copolymer had a pot life of 250 hours, and the resultant magnetic film coated on substrates had a gloss of 95%. Both the blocking tendency and an adhesion of the magnetic film were good.

EXAMPLE 9

The polymerization was initiated at a temperature of 40° C., in the same manner as Example 8 with respect to the type of monomers, the amounts on the monomers charged and the saponification percent. When the percent of polymerization of vinyl chloride and vinyl acetate was 10%, a portion (1/5) of a mixture of 0.6 parts by weight of maleic anhydride, 2.4 parts by weight of maleic acid and 20 parts by weight of acetone was added. The remaining portion (4/5) was intermittently added until the polymerization was continued to a polymerization percent of 70%. After the polymerization continued to a polymerization percent of 90%, the saponification was carried out in the same manner of Example 1.

The resultant resin was a copolymer with a polymerization degree of 900, comprising 90 parts by weight of vinyl chloride, 5 parts by weight of vinyl acetate, 5 parts by weight of vinyl alcohol, 0.5 parts by weight of maleic anhydride and 2.0 parts by weight of maleic acid. This copolymer had a good compatibility. The magnetic coating containing this copolymer had a pot life of 290 hours, and the resultant magnetic film coated on substrates had a gloss of 90%. Both the blocking tendency and an adhesion of the magnetic film were good.

COMPARISON EXAMPLE 5

The polymerization was carried out in the same manner as Example 8, with the exception that the temperature was 32° C. The resultant resin was a copolymer with a polymerization degree of 930, comprising 90 parts by weight of vinyl chloride, 5 parts by weight of vinyl acetate, 5 parts by weight of vinyl alcohol, 0.5 parts by weight of maleic anhydride and 1.0 parts by weight of maleic acid. This copolymer resulted in a translucent product according to the aforesaid compatibility measurement. The magnetic coating containing this copolymer had a pot life of 290 hours, and the resultant magnetic film coated on substrates had a gloss of 40%. Both the blocking tendency and an adhesion of the magnetic film were good.

What is claimed is:

1. A magnetic coating for magnetic recording media comprising:
   a copolymer comprising:
   (A) vinyl chloride
   (B) a vinyl carboxylate ester
   (C) vinyl alcohol, and
   (D) an unsaturated dicarboxylic acid and/or an unsaturated dicarboxylic acid anhydride;
   a thermosetting polyurethane resin;
   a magnetic powder; and
   an organic solvent.

2. The magnetic coating according to claim 1, wherein the average degree of polymerization of said copolymer is from 100 to 900.

3. The magnetic coating according to claim 2, wherein the average degree of polymerization of said copolymer is from 150 to 750.

4. The magnetic coating according to claim 1, wherein said copolymer comprises 50%-90% by weight of component (A); 3%-20% by weight of component (C) based on the sum of the components (A), (B) and (C); and 0.1%-5% by weight of component (D) based on the sum of the components (A), (B) and (C).

5. The magnetic coating according to claim 4, wherein said copolymer comprises 50%-90% by weight of the component (A); 3%-20% by weight of component (C) based on the sum of the components (A), (B) and (C); and the 1%-5% by weight of component (D) based on the sum of the components (A), (B) and (C).

6. The magnetic coating according to claim 1, wherein said component (D) of said copolymer contains said unsaturated dicarboxylic acid and said unsaturated dicarboxylic acid anhydride.

7. The magnetic coating according to claim 6, wherein said unsaturated dicarboxylic acid anhydride is an intramolecular anhydride of the same dicarboxylic acid as said unsaturated dicarboxylic acid.

8. The magnetic coating according to claim 1, wherein said copolymer is prepared by copolymerizing three components corresponding to components (A), (B), and (D), and then partially saponifying the component (B).

9. The magnetic coating according to claim 1, wherein said component (D) is at least one compound selected from the group consisting of vinyl acetate, vinyl propionate, and vinyl stearate.

10. The magnetic coating according to claim 9, wherein said component (B) is vinyl acetate.

11. The magnetic coating according to claim 1, wherein said component (D) is at least one compound selected from the group consisting of maleic acid, maleic anhydride, itaconic acid, itaconic anhydride, fumaric acid and fumaric anhydride.

12. The magnetic coating according to claim 11, wherein said component (D) is maleic acid and/or maleic anhydride.

* * * * *